United States Patent [19]

Roth

[11] Patent Number: 5,082,216
[45] Date of Patent: Jan. 21, 1992

[54] PIPE HANGER ASSEMBLY

[76] Inventor: Steven Roth, 2891 Danville Blvd., Alamo, Calif. 94507

[21] Appl. No.: 622,490

[22] Filed: Dec. 3, 1990

[51] Int. Cl.⁵ ............................................. F16L 3/00
[52] U.S. Cl. ...................................... 248/62; 248/58
[58] Field of Search ...................... 248/58, 59, 62, 60, 248/74.1, 230

[56] References Cited

U.S. PATENT DOCUMENTS

| 840,337 | 1/1907 | Johnson | 248/60 |
|---|---|---|---|
| 948,902 | 2/1910 | Noyes | 248/59 |
| 2,835,464 | 5/1958 | Kolodin | 248/62 |
| 2,923,509 | 2/1960 | Kolodin | 248/62 |
| 3,051,424 | 8/1962 | Duhamel | 248/62 |
| 4,305,557 | 12/1981 | Kowalski | 248/62 |
| 4,440,369 | 4/1984 | Banks | 248/62 |

FOREIGN PATENT DOCUMENTS 8101506  10/1982  Netherlands .......................... 248/59

Primary Examiner—Karen J. Chotkowski
Attorney, Agent, or Firm—Glen R. Grunewald

[57] ABSTRACT

A pipe hanger assembly having a springy, U-shaped hanger with top horizontal shoulders which contain slots and a separate hanger attachable to a suspending rod, the hanger having projections that engage the slots and retain the hanger in position by interlocking the hanger with the slots.

5 Claims, 2 Drawing Sheets

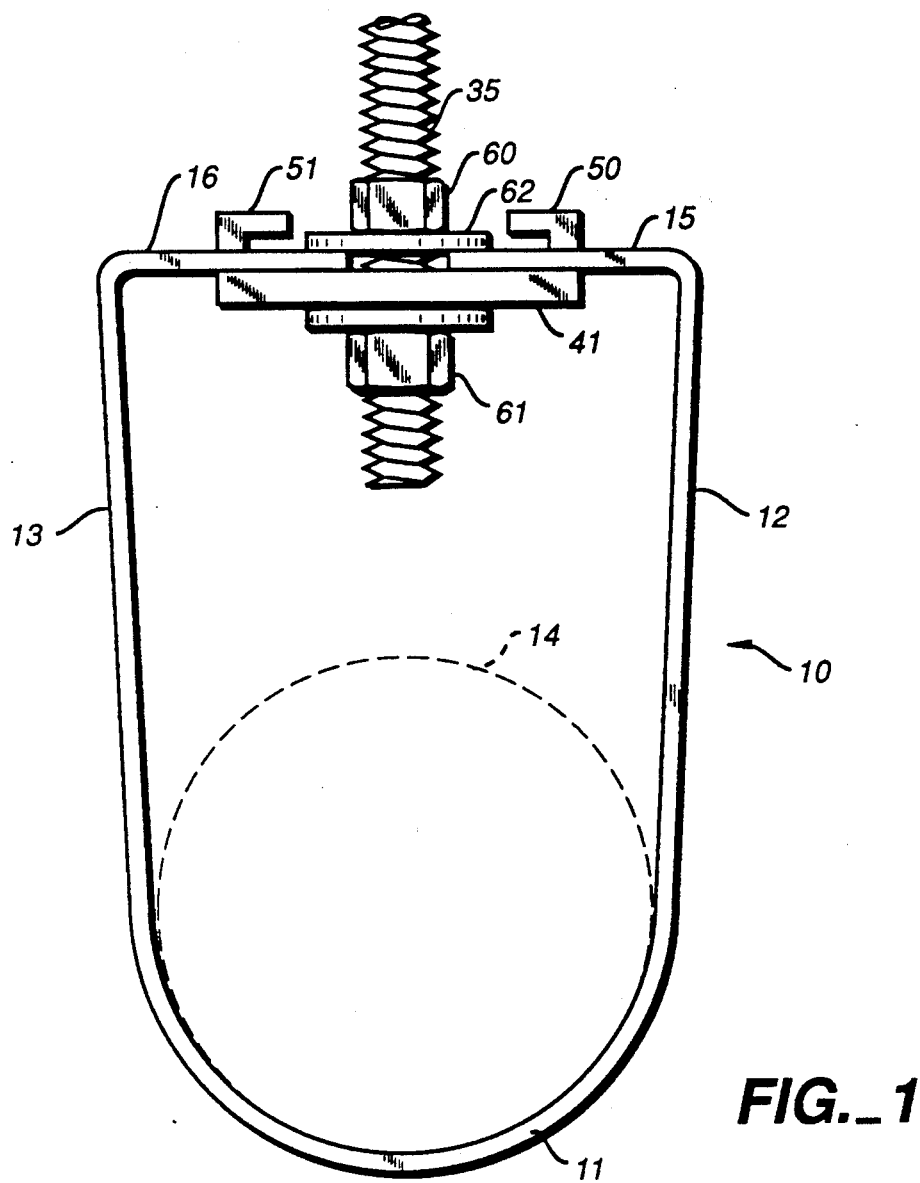
FIG._1
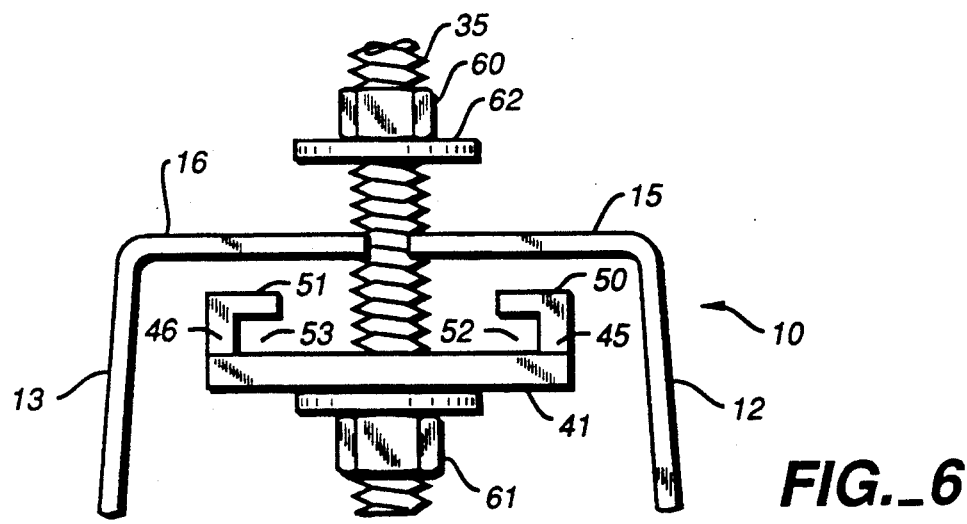
FIG._6

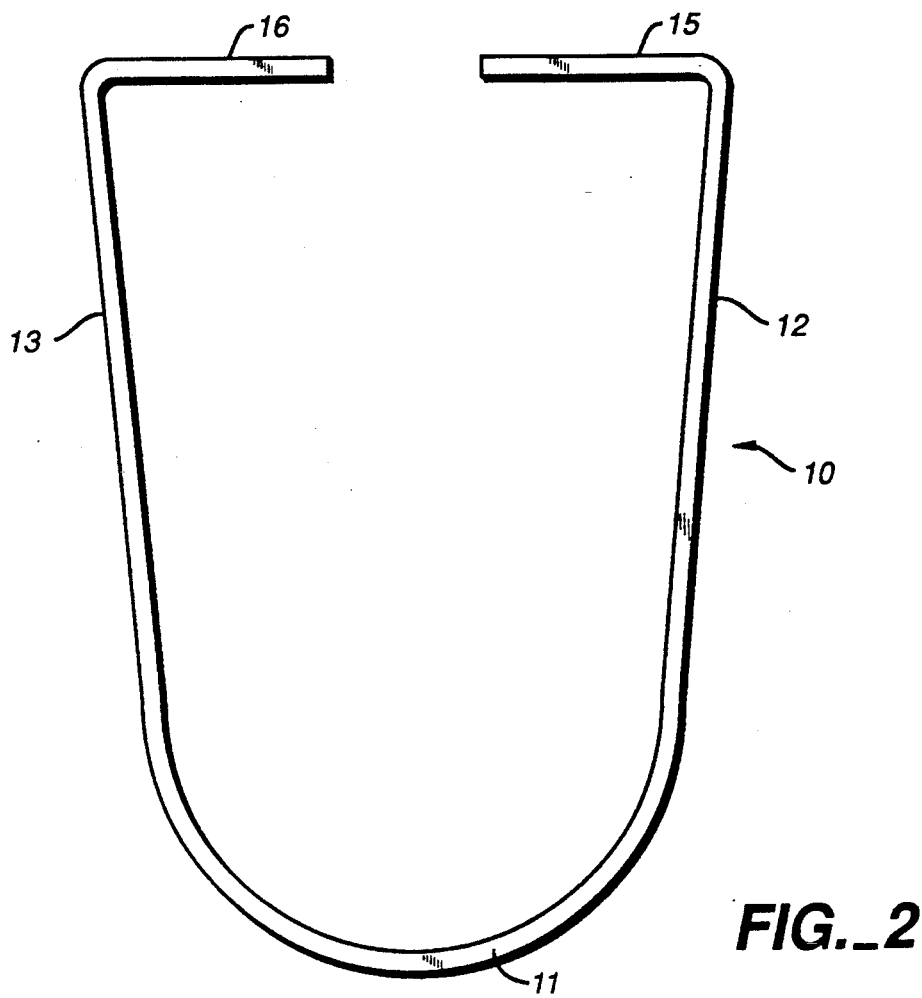
FIG._2
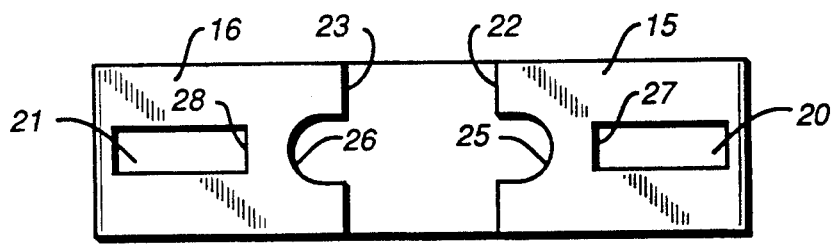
FIG._3
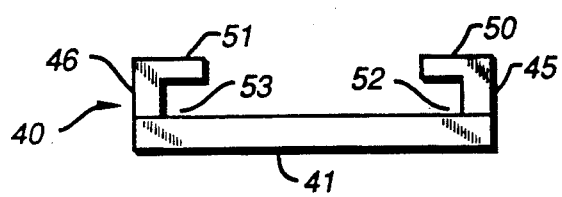
FIG._4
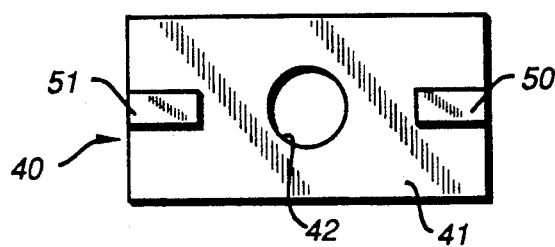
FIG._5

PIPE HANGER ASSEMBLY

TECHNICAL FIELD

This invention is in the field of hangers for pipes such as those used to support lengths of pipe for carrying water, steam or other fluids from ceilings, beams or other overhead portions of structures.

BACKGROUND ART

In many structures pipes for carrying fluid such as hot and cold water, steam, oil, compressed air and the like are suspended from the ceiling or from beams in the structure. The pipes are usually suspended from pipe hangers which are spaced about 8 to 12 feet apart depending on the material from which the pipe is made and the structural demands on the pipe with regard to the density, pressure and temperature of the fluid in the pipe. Pipe hangers are also used to support insulated pipe and are sometimes adapted to accommodate to the size and characteristics of the insulation.

Although pipe hangers come in many forms a very common form is a U-shaped metal strip that is attached to a beam or other structural member by a rod that extends through a hole in the upper portion of the hanger. The rod is usually threaded so that the portion extending through the hole in the upper portion of the hanger can be fitted with a nut and a washer to hold the hanger and to adjust its elevation. All of the hangers used to support a length of pipe are normally placed over the end of the pipe and then each is connected to its threaded support rod one at a time until the length of pipe is properly hung from all of the hangers. The task of hanging a length of pipe is cumbersome because the pipe must be held in position while each threaded rod is placed in the hole through the top of each hanger and then both the hanger and the pipe must be held in position while a washer and nut are installed on the end of the threaded rod. To add to the difficulty, the task of hanging a length of pipe from a number of hangers usually is performed while the installer is standing on a ladder.

DISCLOSURE OF THE INVENTION

This invention is a pipe hanger assembly that can be installed on a hanging rod using no tools and only one hand. The hanger assembly of this invention includes a hanger having the general U-shape of a pipe hanger and having a slotted shoulder portion at the top of each leg of the U-shaped hanger. The shoulder portions are in a generally horizontal orientation when the hanger assembly of this invention is in use.

The device of this invention further includes a holding element that is separately installed on the threaded rod or hanger before a pipe is hung, the holding element having interlock elements that engage the slots in the shoulders of the pipe support, preferably by compressing the natural springiness of the U-shaped pipe holder to fit over interlocking portions of the holding element after which release of the U-shaped hanger causes the slots to be biased away from one another and to engage the interlocking portions of the holding element. A preferred embodiment of this invention is illustrated in the accompanying drawings.

BRIEF DESCRIPTION OF THE DRAWINGS

FIG. 1 is an elevation view of a device embodying this invention.

FIG. 2 is an elevation view of the pipe hanger portion of the assembly of FIG. 1.

FIG. 3 is a top plan view of FIG. 2.

FIG. 4 is an elevation view of the holding element portion of the assembly of FIG. 1.

FIG. 5 is a top plan view of FIG. 4.

FIG. 6 illustrates the positions of various elements of the device at an initial step in the sequence of steps required to install a hanger on a holding element as illustrated in FIG. 1.

BEST MODE FOR CARRYING OUT THE INVENTION

FIG. 1 illustrates the complete assembly of this invention. The assembly includes a hanger that is generally designated 10 which has a rounded bottom portion 11 upon which a supported pipe will rest. The position of the supported pipe is indicated at 14 in a broken line. The hanger has two leg portions 12 and 13 which extend generally upwardly from the curved bottom 11 and in the position of normal use they will be generally parallel to one another. The material from which hanger 10 is constructed is preferably a strip or ribbon of steel that is usually about 1-2 inches wide and approximately ⅛ of an inch thick. These dimensions are not critical to the invention but are the characteristic material from which a hanger is made. The hanger is usually made form steel that is springy enough so that if legs 12 and 13 are forced together or apart from their at-rest position, they will return to their at-rest position when the force is released. When the upper portion of legs 12 and 13 are not restrained they will normally lie in a position where they diverge slightly from the U-shaped portion 11 to the upper portion of legs 12 and 13 as illustrated in FIG. 2.

The upper portion of each of legs 12 and 13 ends in a shoulder that is substantially horizontal in the hanger's normal position in use. Shoulders 15 and 16 are normally bent from the same strip of steel that forms legs 12 and 13, and they extend respectively from legs 12 and 13 toward one another, each shoulder ending in a terminal edge 22, 23 (see FIGS. 2 and 3). Terminal edges 22 and 23 may have cut-out portions 25 and 26 to accommodate supporting rod from which the device is suspended as will be explained in greater detail hereinafter.

Shoulder element 13 includes a slot 20 and shoulder element 15 includes a slot 21. The long dimensions of slots 20 and 21 lie on the same axis. Slots 20 and 21 may extend to or even through legs 12 and 13 but they terminate short of terminal edges 22 and 23. Slot 20 ends in edge 27 and slot 21 ends in edge 28. Slots 20 and 21 are symmetrical about the vertical axis of FIG. 3.

As illustrated in FIG. 1 the pipe support assembly of this invention is held to the structure from which the pipe is supported by a supporting rod 35 which is illustrated in this embodiment as being threaded. The pipe support rod 35 connects to a holding element generally designated 40 and best illustrated in FIGS. 4 and 5.

The holding element 40, in the embodiment illustrated in FIGS. 4 and 5, comprises a plate 41 having a central hole 42. At opposite edges of the plate an upward extension 45 and an upward extension 46 extend upwardly from plate 41 when plate 41 is positioned in normal use. Extensions 45 and 46 terminate, respectively, in locking extensions 47 and 48 which extend toward each other and toward the center of plate 41 and spaced from plate 40-41 to form shoulder receiving notches 52 and 53. The hole 42 receives support rod 35 and supports the entire holder 40 from the rod 35.

As best illustrated in FIG. 1, slots 20 and 21 receive locking extensions 50 and 51 in a manner such that when legs 12 and 13 spring apart toward their normal position as illustrated in FIG. 2 slot edges 27 and 28 engage upward extensions 45 and 46. When so engaged upward thrusts on hanger 10 are restricted because shoulders 15 and 16 contact locking extensions 50 and 51 which prevents hanger 10 from disengaging from holder 40.

In a preferred embodiment of the invention a washer 62 may be forced against shoulders 15 and 16 to prevent them from coming together closely enough to disengage slots 20 and 21 from extensions 50 and 51 and nut 60 may be screwed down rod 35 to lock washer 62 in place and to provide a jam fit that prevents vibrations from loosening nut 61. Manipulation of nuts 60 and 61 may be used to adjust the elevation of hanger 10 as well as to fix holder 40 in position.

FIG. 6 illustrates the initial stage in the assembly of hanger 10 on holder 40. Hanger 10 is positioned with shoulders 15 and 16 above holder 40 in a position such that slots 20 and 21 are immediately above locking extensions 50 and 51. The installer normally will grasp hanger 10 in one hand and squeeze legs 12 and 13 together against the natural spring force they exert so that legs 12 and 13 converge upwardly from curved bottom 11. When slots 20 and 21 are immediately above locking extensions 50 and 51 hanger 10 is lowered and legs 12 and 13 are released so that they spring apart until notch edges 20 and 28 engage upward extensions 45 and 46, as illustrated in FIG. 1. Normally pipe 14 will be positioned within hanger 10 before the installation procedure begins, however all of the hangers that are to be used to support pipe 14 may be positioned on holder 40 before a pipe is installed, and a pipe 14 may be slid lengthwise into the holders that are positioned to receive it.

The various elements illustrated in the preferred embodiment may take on different forms and still be within the scope of this invention. By way of example, hanger 10 need not be U-shaped and in fact may be flat on the bottom and wide enough to hold multiple pipes side-by-side. Additionally, hanger 10 need not be springy. It can be made out of malleable material and held in place by manually spreading legs 12 and 13 after they are engaged with hanger 40 and preventing them from coming together by means such as washer 62.

I claim:

1. A pipe hanger assembly for hanging a pipe from a pipe-hanger support comprising:
    a hanger having a pipe engaging element at the lower portion thereof;
    first and second legs made from springy material extending generally upwardly from opposite ends of said pipe engaging element;
    first and second shoulder elements extending toward each other in a generally horizontal direction respectively from the upper portions of said first and second legs and terminating in first and second edges spaced from each other a distance greater than the maximum dimension of said hanger support;
    first and second slots located respectively in said first and second shoulder elements, said first and second slots terminating short of said first and second edges and having their long directions generally symmetrical about a common axis;
    a holding element having
        means to connect to said hanger support
        first and second diametrically opposed lateral extensions extending from said means to connect to said hanger support;
        first and second upward extensions located respectively at the end of each of said first and second lateral extensions;
        first and second locking elements located respectively at the upper end of said first and second upward extensions and extending toward one another a distance shorter than the length of said first and second slot, and spaced from said lateral extensions a distance greater than the thickness of said first and said second shoulder elements, said upward extensions and said locking extensions being narrower than the widths of said slots, said upward extensions elements through said slots whereby when said springy legs are biased toward each other said locking elements superimpose said slots and when said springy legs are biased away from each other a portion of each of said shoulder elements is superimposed by one of said locking elements.

2. The hanger assembly of claim 1 wherein said hanger is shaped to bias said first and second legs toward a position wherein the upper portions of said legs diverge from parallel.

3. The hanger assembly of claim 1 including means surrounding said hanger support, said means dimensioned to lie between said first and second edges.

4. The hanger assembly of claim 3 wherein said hanger support is a cylinder and said means to surround said hanger support is a washer.

5. The hanger assembly of claim 1 wherein said pipe engaging element is semicircular.

* * * * *

UNITED STATES PATENT AND TRADEMARK OFFICE
CERTIFICATE OF CORRECTION

PATENT NO. : 5,082,216
DATED : January 21, 1992
INVENTOR(S) : STEVEN ROTH

It is certified that error appears in the above-identified patent and that said Letters Patent is hereby corrected as shown below:

Column 2, line 32, "form" should be --from--.

Column 4, claim 1, line 6, "ends" should be --sides--.

Column 4, claim 1, lines 35-36, "extensions" should be --elements--.

Column 4, claim 1, line 37, "elements" should be --extending--.

Signed and Sealed this

Third Day of August, 1993

Attest:

MICHAEL K. KIRK

Attesting Officer

Acting Commissioner of Patents and Trademarks